United States Patent [19]

McClung, Jr. et al.

[11] Patent Number: 4,700,068

[45] Date of Patent: Oct. 13, 1987

[54] APPARATUS AND METHOD FOR SPATIALLY CHARACTERIZING AND CONTROLLING A PARTICLE BEAM

[75] Inventors: Frederick J. McClung, Jr.; James G. Small, both of Albuquerque

[73] Assignee: Hughes Aircraft Company, Los Angeles, Calif.

[21] Appl. No.: 824,485

[22] Filed: Jan. 31, 1986

[51] Int. Cl.$^4$ .................... H01S 1/00; H01S 9/00; H01J 37/147

[52] U.S. Cl. .................... 250/251; 250/397; 250/491.1

[58] Field of Search ............ 250/251, 397, 398, 491.1; 324/96, 98

[56] References Cited

U.S. PATENT DOCUMENTS

| | | | |
|---|---|---|---|
| 3,742,219 | 6/1973 | Damm et al. | 250/251 |
| 3,838,284 | 9/1974 | McIntyre et al. | 250/397 |
| 4,140,576 | 2/1979 | Fink et al. | 250/251 |
| 4,260,895 | 4/1981 | Bakkler et al. | 250/398 |
| 4,260,897 | 4/1981 | Bakkler et al. | 250/398 |
| 4,502,937 | 3/1985 | Yagi | 324/96 |

OTHER PUBLICATIONS

"High Intensity Beam Profile Monitor for the LAMPF Primary Beam Lines," by E. W. Hoffman et al., in IEEE Transactions on Nuclear Science, vol. NS-26, No. 3, Jun. 1979.

"Recent Improvements in Beam Diagnostic Instrumentation," by O. R. Sander et al., in IEEE Transactions on Nuclear Science, vol. NS-No. 3, Jun. 1979.

"Secondary Emission Monitors at the BEVA-TRON-BEVALAC," by John J. Barale et al., in IEEE Transactions on Nuclear Science, vol. NS-26, No. 3, Jun. 1979.

*Primary Examiner*—Bruce C. Anderson
*Attorney, Agent, or Firm*—Ronald L. Taylor; A. W. Karambelas

[57] ABSTRACT

A system and method is described for obtaining a spatial characterization of a particle beam, including the beam direction, position, divergence, aberrations and intensity profile. A mechanism is also provided for adjusting the beam propagation to a desired state in response to the sensed characteristics. A fiber array in the path of a neutral particle beam casts shadows which are sensed at a downstream location to characterize the beam. Various mechanisms can be used to sense the shadow positions and/or widths relative to the fibers, from which the various beam characteristics can be derived. By magnetically removing charged particles from the neutral beam shadows, the shadows can be sensed by their effect upon the secondary emission currents generated in downstream conducting sensor wires, by their effect upon the fluorescence of downstream optical fibers, or by their effect upon the thermal heating of various types of downstream heat sensors. The shadows can also be sensed directly by the differences in their spectral radiation compared to that of the beam. A very high degree of precision is obtained in directing the beam, while initial coarse measurements and adjustments can be derived by providing the fiber array as a grid of conductive wires and sensing differentials in the secondary emission currents generated in the various wires.

45 Claims, 15 Drawing Figures

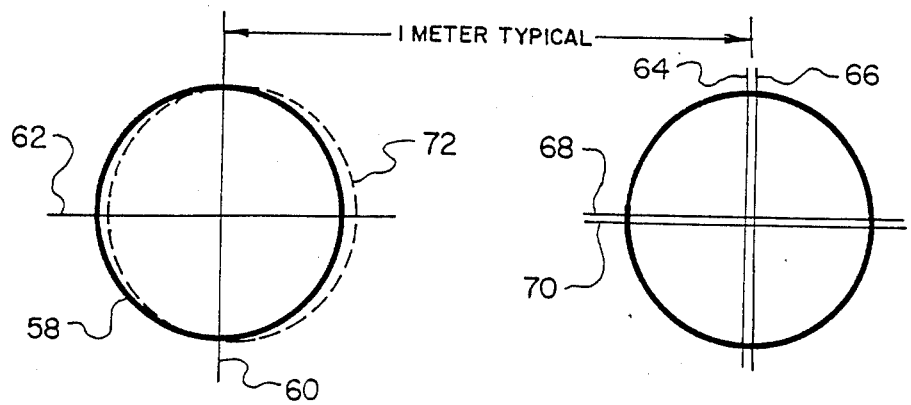
Fig. 3.a.  Fig. 3.b.
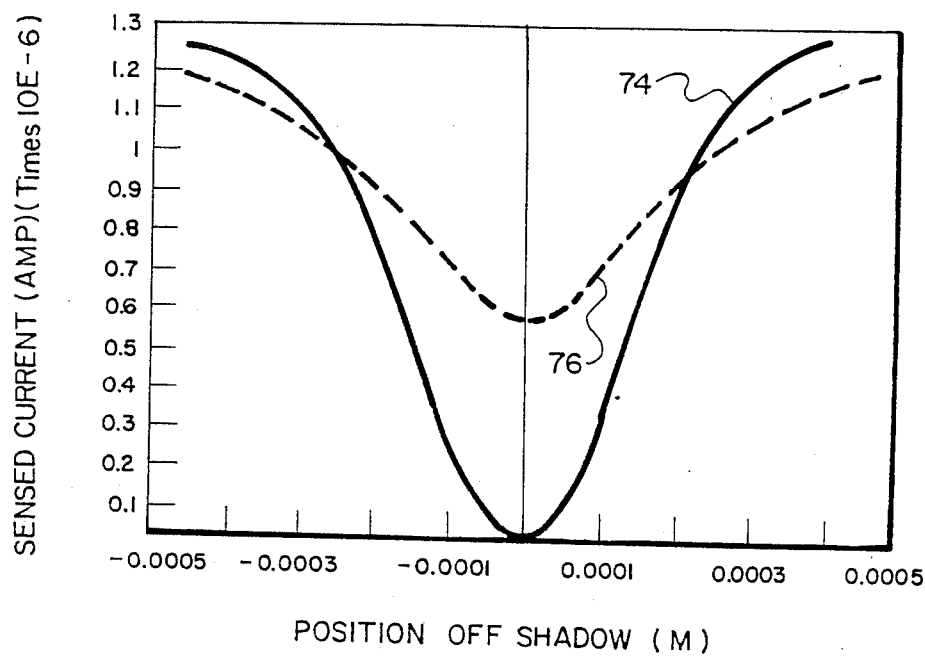
Fig. 4.

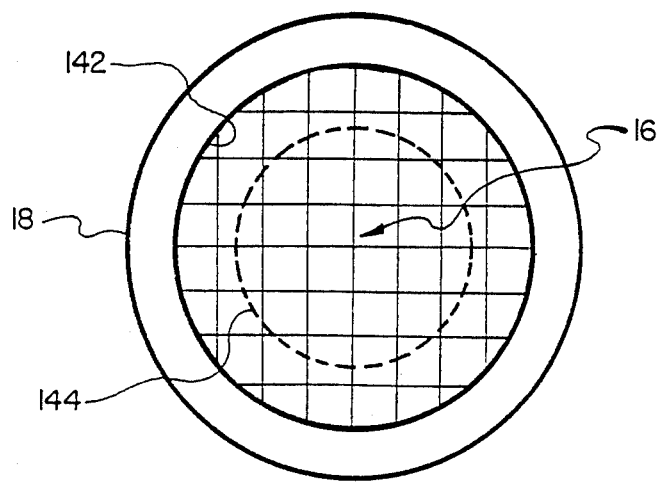
Fig.12.
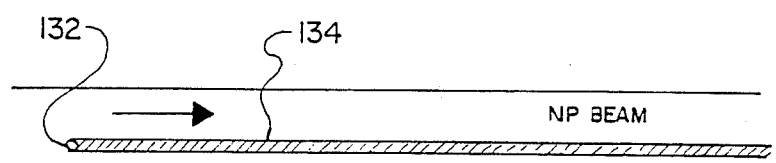
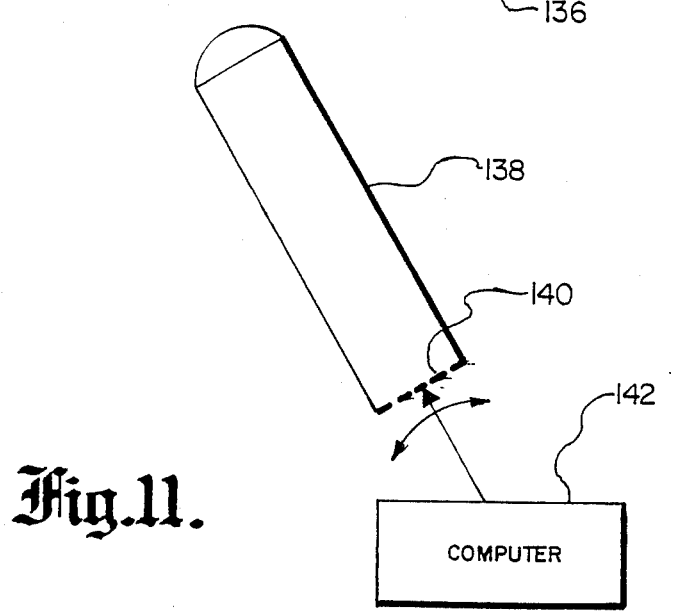
Fig.11.

APPARATUS AND METHOD FOR SPATIALLY CHARACTERIZING AND CONTROLLING A PARTICLE BEAM

BACKGROUND OF THE INVENTION

1. Field of the Invention

This invention relates to apparatus and methods for spatially characterizing a particle beam, and more particularly to apparatus and methods for sensing the direction, location, convergence, aberrations and intensity profile of a neutral particle beam, and for controlling the beam propagation in response to one or more of the sensed characteristics.

2. Description of the Prior Art

Neutral particle beams may be generated with diameters ranging from 1 mm. to 100 cm. or greater, and correspondingly large amounts of energy. It is necessary that the beams be directed with extreme accuracy over distances of thousands of miles, and that they be carefully controlled to avoid losses from convergence, divergence or aberrations. It has been difficult to develop a system capable of sensing these spatial characteristics of a high energy neutral particle beam, partly because sensing apparatus that occlude any significant portion of the beam tend to be destroyed because of excessive heating from the beam.

Neutral particle beams can be formed from atoms of a variety of different elements, the particular type of particle selected depending upon the end use for the beam. The beams are typically generated by accelerating negatively charged particles in a nuclear particle accelerator to a very high energy level. The particles are charge-neutralized just prior to release from the accelerator by removing the excess electrons. This is accomplished either by passing the charged beam through a dilute curtain of gas which strips off electrons, or by using a resonant laser beam to excite extra electrons sufficiently to remove them. The length of the beam path through the electron stripping medium together with the gas density or laser strength determines the amount of electron stripping; the result of each method is often a mix of neutral and charged beam particles.

Two approaches are presently being investigated to sense the direction of a neutral particle beam. The first is an edge sensing technique that uses a "pin hole" sensor. This in essence is a lead plate with a series of pin holes that is placed around the edge of the beam and emits a series of pin hole beams. The pin hole beams are small enough in diameter so that their directions can be traced by placing a target in their path and detecting where they strike the target. The direction of the pin hole beams, and thus of the entire beam, can then be determined by comparing the location of the pin hole beams at the target with the locations of the source pin holes. The pin hole approach is not believed to have been demonstrated to date, but it is expected to have operational problems since only the edges of the beam are sensed, and the known aberrations in the beam shaping optics are likely to give the wrong beam directions from the edges.

The second approach being investigated uses a laser resonance fluorescence (LRF) sensor. The LRF concept aligns a laser to the particle beam at a large angle such as 54°, after which the laser beam needs to be rotated to the particle beam line of sight with accuracies in the order of 1:1,000,000. The 54° angle is dependent upon the beam energy and laser wave length, and is difficult to maintain as the particle beam is pointed. An additional limitation of the LRF approach is that it is dependent upon a weak optical interaction, which is likely to result in serious limitations for high bandwidth control loops.

In addition to accurately determining the beam direction, it is highly desirable that a technique be developed for reliably determining the beam's divergence or convergence (the term "divergence" will be used hereinafter to include both positive divergence, and convergence as a negative divergence). As it is generated, a neutral particle beam is expanded and recollimated and can have an undesirably high divergence as it emerges from the expansion optics. It would be desirable to restrict any divergence to less than 10 microradians, but to do this an accurate mechanism for sensing divergence must be developed.

SUMMARY OF THE INVENTION

A principal object of the present invention is the provision of a unique apparatus and method for determining the spatial characteristics of a high energy particle beam with great accuracy and without the beam destroying the sensing mechanism.

Another object is the provision of such an apparatus and method which is capable of sensing the beam direction, divergence and/or aberrations, and for adjusting the generation of the beam to reduce errors in these characteristics to within acceptable tolerances.

A further object is the provision of such an apparatus and method which operate with great accuracy, does not depend upon weak and complex interactions to sense the neutral particle beam, is relatively easy to implement and provides beam spatial characterizations which are at least to the first order independent of the beam energy.

These and other objects are achieved in the present invention by disposing an array of fibers at known positions in the beam path, the fiber thicknesses normal to the beam being much smaller than the beam diameter, and detecting the spatial incidence pattern of the beam on the fiber array to spatially characterize the beam. The detection means may be connected in a feedback loop with means for adjusting the beam to a desired propagation state in response to the beam's detected spatial incidence pattern. This arrangement may be used to control the beam direction, location, divergence and aberrations, and to obtain intensity profiles or reduce jitter.

In the preferred embodiment advantageous use is made of the fact that the fibers each cast a shadow in the beam in a direction corresponding to the beam direction. The fibers strip incident beam particles to produce charged particle shadows, and a magnetic field is provided downstream from the fibers to remove charged particles from the shadows. The fiber shadows are then sensed at a downstream location from the fiber array to obtain the desired beam characterization. To determine the beam direction, the position of the downstream shadows are compared with the fiber positions. To determine the divergence of the beam as a whole or of individual portions of the beam, the downstream shadow widths are sensed and compared with the fiber widths.

The shadow sensing mechanism preferably comprises a pair of elongate sensors for each of selected fibers in the array, the sensors being parallel to their corresponding fiber and spaced apart to accommodate at least a portion of the fiber shadow therebetween. Imbalances in the portion of each shadow incident upon its respective sensors are sensed as an indication of a shadow positional offset. Accurate x,y positional information can be obtained by placing the fibers and their corresponding sensor pairs in crosshair arrangements. A variety of different shadow sensors can be used, including conductive wires which generate secondary emission currents, fluorescent optical fibers which generate optical signals in response to incident beam particles, or heat generating fibers that generate heat in response to incident beam particles, the amount of heat produced being measured by sensing thermally induced mechanical changes, electrical resistance changes, or changes in index of refraction. In each case the magnitude and distribution of the downstream sensor response varies with the incidence pattern of the shadows upon the sensors. The shadows can alternately be located by sensing the degree of electron stripping present in the beam at a predetermined downstream location in an expected shadow path, or by transmitting a laser beam onto the fibers in alignment with the particle beam path and optically sensing the shadows cast in the laser beam.

The fibers can be provided as electrically conductive wires, in which case the incident beam will generate currents in the wires in amounts determined by the beam current and by the length and position of the wire within the beam. The beam position at the wires can be determined by comparing the relative currents generated in the various wires, and the beam direction can be determined by comparing the beam position at the wire array with the position of the beam generating apparatus. This technique is preferably used as a coarse characterization step in conjunction with a fine characterization step based upon the fiber shadows.

Further features and advantages of the invention will be apparent to those skilled in the art from the following detailed description of preferred embodiments, taken with the accompanying drawings, in which:

DESCRIPTION OF THE DRAWINGS

FIGS. 3a and 3b are respectively diagrams of a pair of fibers disposed in the particle beam path, and two sets of sensors adapted to sense shadows cast by the fibers;

FIG. 4 is a graph of the shadow current profile;

FIG. 11 is a schematic diagram illustrating a technique of directly sensing shadows in the particle beam by detecting the fluorescent radiations;

FIG. 12 is a plan view of a support structure for a wire grid used in characterizing the particle beam;

DETAILED DESCRIPTION OF PREFERRED EMBODIMENTS

Figure 1:
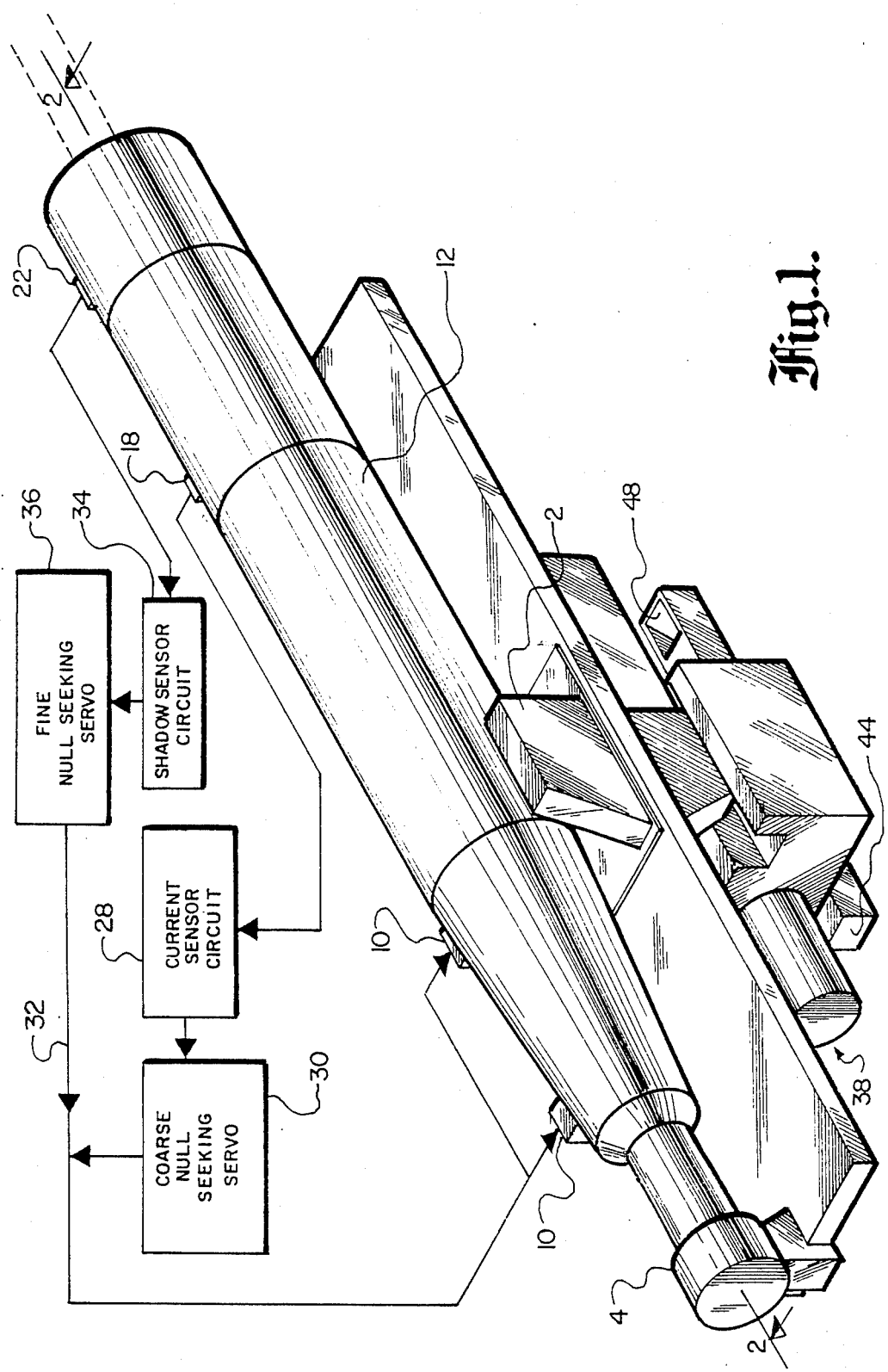
FIG. 1 is a perspective view of a neutral particle beam generator utilizing the present invention.
Figure 2:
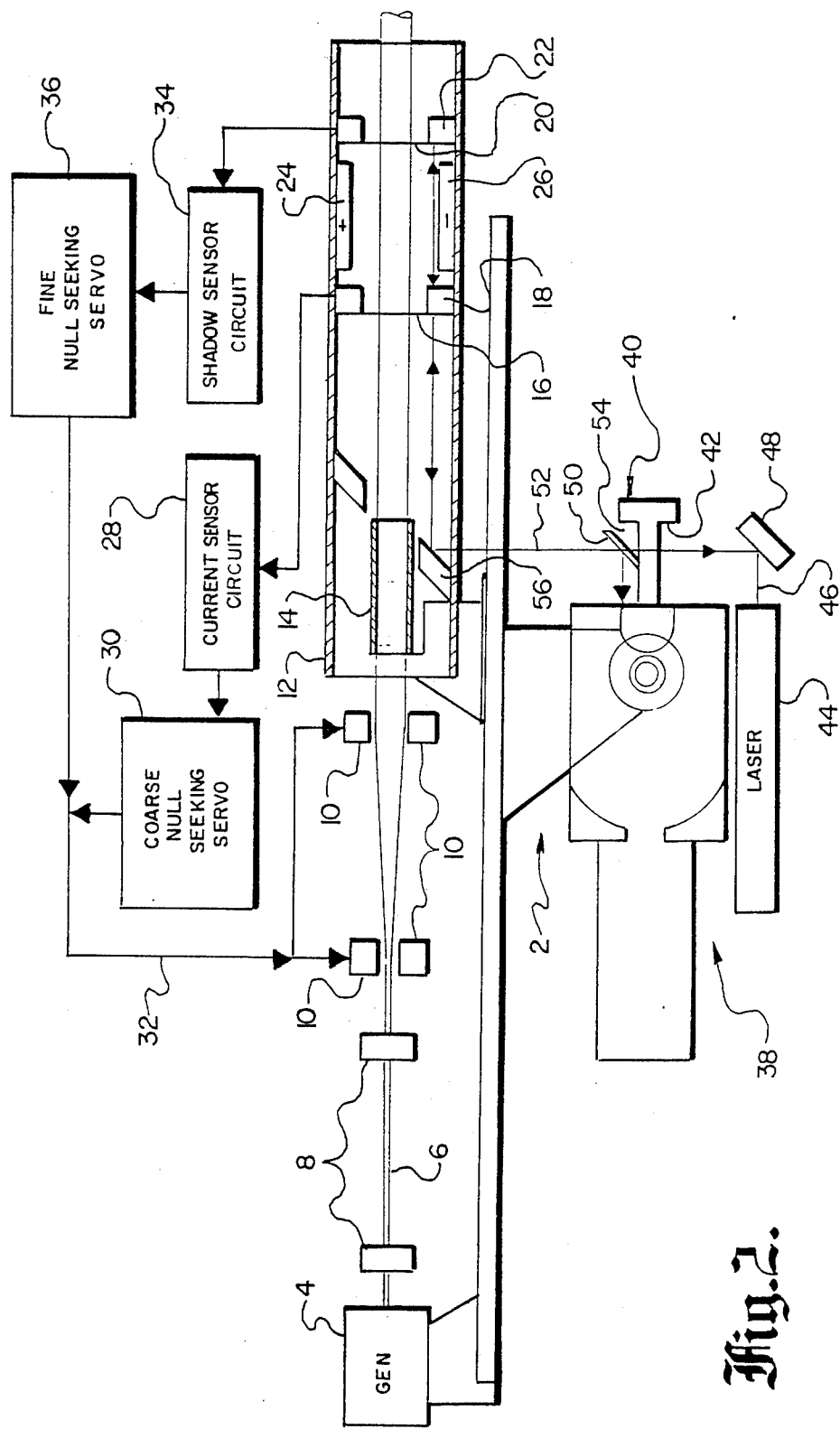
FIG. 2 is a partially schematic sectional view taken along the line 2—2 of FIG. 1.

FIG. 1 is a perspective view and FIG. 2 is a somewhat diagrammatic illustration of a neutral particle beam generator that uses the present invention to determine the direction or other spatial characteristics of the generated beam, and to automatically adjust the beam so that it is aimed or otherwise propagated properly. The principle elements of the system are mounted on a strong support structure 2, typically made of a non-magnetic material. The beam is initially formed as a charged particle beam in a conventional beam generator 4. A number of different elements can be used to provide the beam particles, ranging from relatively heavy to relatively light elements depending upon the intended application. The charged particle beam 6 is directed through a spaced pair of conventional devices 8 to reduce beam jitter that is frequently present at the generator output. The beam is then directed past a set of lenses and steering magnets 10 that expand the beam and steer it in the desired direction. The expanded beam enters a discharge housing 12, within which a charge neutralizing device 14 removes electrons from the negative beam ions either by passing the beam through a dilute curtain of electron stripping gas, or exciting the beam particles with a resonant laser beam to remove excess electrons. Up through the neutralizer 14 the beam generating system may be considered to be conventional.

Downstream from neutralizer 14 an array of thin fibers 16 is placed in the beam path and secured in a stationary position within the discharge housing 12 by means of a support structure 18 that is attached to the interior discharge chamber walls, out of the beam path. The fibers are quite thin in a direction normal to the beam, their thickness preferably being in the order of about 0.2 mm as compared to a beam diameter of typically 0.1–1 meter. This assures that the wires occlude only a very small portion of the entire beam, thereby both minimizing interference with the beam and keeping the heating of the fibers from the beam impact to within acceptable limits. Acceptable materials for the fibers include virtually any kind of conductive material that will support such temperatures, such as tungsten, and refractory materials such as sapphire, graphite and silicon carbide fibers.

When the beam particles strike the fibers, electrons are stripped off by the fibers to produce charged particle "shadows" of the fibers in the downstream beam path. While simple fiber cross-sections such as circles are preferred, more elaborate fiber profiles may be used, so long as the portion of the fiber exposed to the beam is kept small enough to avoid overheating and the shadow dimensions are not overly large. For example, blade-shaped fibers positioned with their broad edges parallel and their sharp edges normal to the beam could be employed.

An array of shadow sensors 20 corresponding to the fibers 16 are positioned in the beam at a downstream location from the fibers and held in place by a support structure 22 attached to the inside wall of the discharge housing, out of the beam path. The shadow sensors are adapted to sense the locations and/or widths of the shadows cast by the various fibers. This information can then be compared with the positions and widths of the fibers 16 to determine the beam direction and divergence. For example, if a fiber shadow is located at a position relative to the discharge housing which is different from the position of its corresponding fiber, it indicates that the beam is not directed parallel to the discharge chamber axis; the exact beam direction can be determined from the amount of shadow offset and the distance between the fibers and shadow sensors. If the shadow is thicker than its corresponding fiber, it indicates that the beam is diverging; a thinner shadow indicates a negative beam divergence (convergence). If fibers are placed at different locations within the beam and the thicknesses of their corresponding shadows measured, an indication of the beam divergences at those various locations can be determined. Variances in the degree of beam divergence at different locations within the beam corresponds to beam aberrations that may be at undesirable levels.

Although it would be possible to detect positively charged shadows, it is usually desirable that charged particles be substantially removed from the fiber shadows, leaving shadows that have a lower particle density than the remainder of the beam. To this end positive and negative magnetic pole plates 24 and 26 are positioned along opposite sides of the discharge housing between the fibers and shadow sensors. The positive shadow ions resulting from electron stripping of the beam particles by the fibers are mostly deflected out of the beam path in one direction, while negatively charged particles are deflected in the opposite direction. Due to the small dimensions of the fibers and the finite transverse momentum in the beam (emittance), the shadows will tend to fill in after a few meters. However, at distances less than where the shadows completely fill in they will have well-defined features that can be used to precisely measure and control the beam direction and focus.

The fibers 16 may be provided in the form of a grid of electrically conductive wires. In this case the electrons stripped off the incident beam particles will accumulate a charge produced by secondary emission currents in the wires. The relative magnitudes and distribution of the wire currents are indicative of the beam location at the wire grid, and are sensed by a current sensor circuit 28. Circuit 28 provides an indication of the position of the beam at the fiber array by the distribution of beam-induced currents among the various fiber wires. Its output is delivered to a null seeking servo circuit 30, which compares the actual beam position with the desired beam position corresponding to the desired direction for the beam. If the actual and desired beam positions are not the same, servo circuit 30 produces an output that is delivered over line 32 to the lenses and steering magnets 10 used in forming the beam. This produces a corrective adjustment in the beam direction which is sensed by the fiber wires, progressively reducing the corrective signal from servo circuit 30 until the beam is properly directed.

The accurate operation of current sensor circuit 28 and null seeking servo 30 in correctly steering the beam is dependent upon a comparison of the beam position at the wire array with its position at the beam generating apparatus. There is normally a certain amount of jitter in the beam, and the steering achieved by servo circuit 30 can thus be considered to be a coarse adjustment. This is followed by a fine adjustment obtained from the shadow sensors 20. While in the preferred embodiment an initial coarse adjustment is obtained from circuit 28 and servo 30, this initial coarse adjustment step can be omitted and the characterization of the beam achieved solely by the shadow sensing apparatus.

A shadow sensor circuit 34 receives the outputs of the shadow sensors 20 and in turn produces an output signal which indicates any differential between the actual beam propagation and the desired propagation. Either an incorrect beam direction, incorrect divergence, or both, may be indicated. The differential signal is applied to a fine null seeking servo circuit 36, the output of which is connected in common with the output of coarse null seeking servo circuit 30 to apply adjustment control signals to the lenses and steering magnets 10 in the beam generator.

The particule beam aiming is controlled by a boresight assembly 38 which acquires and tracks a target at which the beam is to be directed. A special alignment system is provided to assure that the boresight detector is properly aligned with the beam sensing apparatus. An inertial reference mirror 40 extends out from the forward end of the boresight detector, with a reflective surface 42 facing the detector. Surface 42 is carefully aligned in a predetermined angular relationship with the detector mechanism, and serves as a reference for aligning the beam apparatus with the boresight detector. A laser 44 produces a beam 46 which is directed by mirror 48 onto a beam splitter 50 positioned between reference surface 42 and the boresight detector. A portion 52 of the laser beam is transmitted through the beam splitter towards the particle beam generating apparatus, while another portion 54 of the laser beam is directed at a right angle onto reference surface 42 and reflected back from that surface into the boresight. The laser beam portion 52 which continues into the particle beam generator is reflected off a mirror 56 in the beam discharge housing in a direction parallel to the particle beam axis but outside of the particle beam.

The support structure 18 for the fiber array comprises a partially reflective, partially transmissive mirror which is very flat and holds the fiber array in a flat plane parallel to that of the mirror. The support structure 22 for the shadow sensors is provided as a fully reflective mirror. The laser beam portion 52 travelling inside the particle beam discharge housing is partially reflected back from fiber support mirror 18, off mirror 56, and off the reflective upper surface of beam splitter 50 into the boresight detector. The remainder of the laser beam within the particle beam discharge housing continues onto the shadow sensor support mirror 22, from which it is reflected back along substantially the same path into the boresight detector. If the fiber support mirror 18 (and accordingly the fiber array) and the shadow sensor support mirror 22 (and accordingly the shadow sensors) are perfectly parallel to the reference surface 42, the laser beam 52 will strike them at right angles and be reflected back into the boresight detector along a path substantially identical to the portion of the laser beam which is reflected directly from the reference surface into the boresight detector. If, however, either the fiber support mirror 18 or shadow sensor support mirror 22 are offset from the reference surface 42, indicating a misalignment between the boresight detector and particle beam generating apparatus, the laser beam reflections from the support mirrors will enter the boresight detector at an offset from the reference surface reflection. The alignment between the boresight detector and particle beam generating apparatus can then be corrected, based upon the direction and amount of offset. If desired, only a reflection off the fiber support mirror need by obtained, and this mirror can be made totally reflective for this purpose. Such a simplification, however, will not be capable of detecting any possible misalignments between the fiber support mirror 18 and the shadow sensor support mirror 22.

Referring now to FIGS. 3a and 3b, a simple format for the shadow casting fibers and for the downstream shadow sensors is shown. In FIG. 3a the particle beam 58 is illustrated as being directed over a vertical fiber 60 and a horizontal fiber 62 arranged in crosshair fashion. This produces a crosshair-shaped shadow which is sensed by a shadow sensing system arranged in a similar crosshair fashion, as shown in FIG. 3b. The sensing apparatus comprises a vertical pair of parallel, elongate sensors 64,66 and a horizontal pair of parallel, elongate sensors 68,70. Sensors 64,66 are spaced apart from each other by an amount corresponding to the width of fiber 60, while sensors 68,70 are spaced away from each other by an amount corresponding to the thickness of fiber 62. Thus, for a collimated particle beam each sensor pair can accommodate a shadow from its corresponding fiber between the two sensors, with the outside edges of the shadow adjacent the inside edges of the opposed sensors; a similar relationship is established for sensor pair 68,70 and their corresponding fiber 62. Thus, if the particle beam is not properly aimed exactly parallel to the discharge housing axis, at least one of the fiber shadows will be offset and extend onto one or the other of its corresponding sensors. For example, for a frame of reference in which fiber 62 is the x axis and fiber 60 is the y axis, a change in the direction of the beam so that it falls on the fiber array with an x-axis offset as indicated by the dashed circle 72 is FIG. 3a. This causes the shadow from fiber 60 to move to the right in FIG. 3b falling on sensor 66 but not on sensor 64. The amount of the shadow incident on sensor 66 is then detected as an indication of the degree of x-axis offset. Similarly, an upward y-axis offset will cause the shadow from fiber 62 to move onto sensor 68, producing an imbalance between the outputs of sensors 68 and 70 which indicates the amount of y-axis offset. For offsets in both the x and y directions, imbalances will result between both the vertical and horizontal pairs of sensors.

For greater sensitivity to changes in particle beam direction, it is desirable that each fiber shadow extend substantially across the entire gap between its corresponding sensors, but not protrude onto either sensor when the beam is properly aimed. Thus, any error in the beam direction will immediately be detected by the shadow impinging upon one sensor or the other, while a maximum differential between the shadow on each sensor will be maintained for greater sensitivity.

The described sensor pairs can also be used to detect the shadow thicknesses, which can then be compared with the fiber thicknesses to determine whether the beam is positively or negatively divergent. Thus, if the shadow extends onto both sensors, an increasing shadow thickness corresponding to a divergent beam is indicated. For the purpose of measuring beam divergence, the sensor pairs are preferably placed somewhat closer to each other than the expected shadow thickness. This allows a negative divergence (convergence) in the beam to be detected as a reduction in the amount of shadow impinging upon each sensor. By dispersing a greater number of fibers and corresponding sensors throughout the beam, an indication of divergence at various different locations in the beam may be obtained. If a beam is found to be positively divergent at some points and negatively divergent at others, or divergent by different amounts at different locations, aberrations in the beam can thus be identified. If it is desired to use the same sensor array to detect both directional offsets and beam divergences, a trade-off may be reached in selecting the gap dimensions between adjacent sensors to allow for a measure of both phenomenon.

The further the shadow sensors are located away from the fiber array, the greater will be their sensitivity to directional beam offsets, but the dynamic sensitivity range will be reduced. It is preferable that the shadow sensors be positioned about half-way between the fiber array and the point at which the shadows fills in. The sensor sensitivity at this position is illustrated in FIG. 4. This graph is for shadow sensors provided in the form of conductive wires which establish secondary emission currents in the sensor as a function of the shadow position. With the shadow centered over the sensor wire, in the ideal case no particles are present to strike the wire, and zero current is generated. As the shadow is deflected off the sensor to the left or right, a current begins to flow in the wire as a result of its being hit by progressively more and more beam particles. Curve 74 illustrates the relationship between the sensor wire current and the shadow position with the sensor wire located about half-way between the fiber array and the point at which the shadow fills in. If the sensor wire were moved to a position further downstream, nearer where the shadow fills in, the current response curve would be as illustrated in curve 76. This curve is considerably steeper that curve 74, indicating a higher sensitivity but lower dynamic range. Conversely, moving the sensor wire closer to the fiber array would result in a shallower current response curve, with less sensitivity but greater dynamic range. The half-way point is considered to be a good trade-off between sensitivity and dynamic range. The total width of the shadow preferably corresponds to only about 600 microradians.

Figure 5:
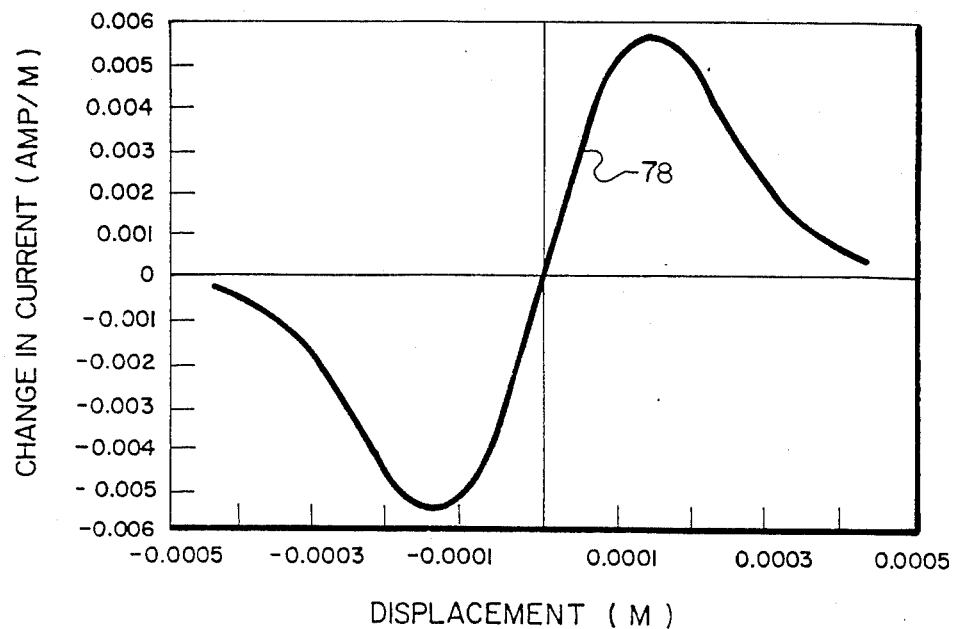
FIG. 5 is a graph of the rate of change of shadow current versus position in the shadow.

A plot of the current change in the sensor wire versus the shadow position is illustrated in FIG. 5, with the same horizontal position scale as in FIG. 4. This graph in effect illustrates the current differential between the two parallel sensor wires for changes in the shadow position. This in turn is reflected in the gain of the servo 36 for the shadow sensor circuit. With the sensor wires positioned about half-way between the fiber array and the shadow fill-in location, as for FIG. 4, the current change curve 78 will be linear in the vicinity of the origin. This is a helpful characteristic that enhances the precision of the servo control. With typical beam dimensions, the servo gain will be high and linear for a beam angular range of about 100–200 microradians. For a pair of sensor wires whose currents are null balanced on either side of the shadow, the overall precision can be better than 1 microradian. With this sensing apparatus it is possible to control the direction of the particle beam and to focus the beam to precisions that far exceed those presently attainable. In addition, as stated above the shadow sensing apparatus can also serve as a sensor to measure beam divergence and aberrations.

Figures 6, 7:
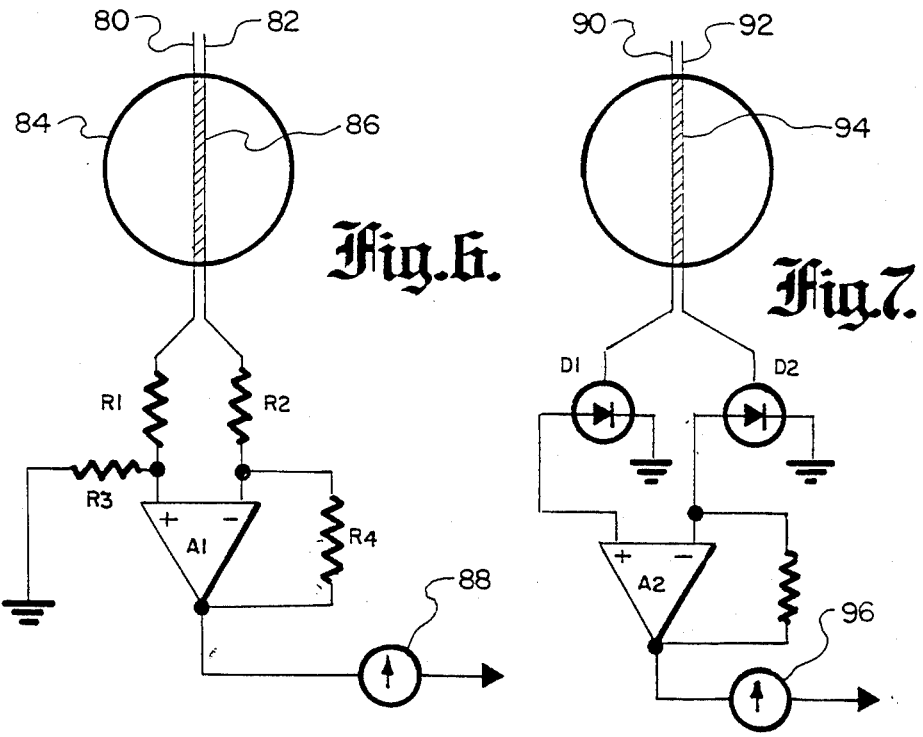
FIGS. 6, 7, 8, 9 and 10 are schematic diagrams of shadow sensors which respectively operate by sensing shadow-influenced secondary emission currents, optical fluorescence, wire resistance changes, thermal-induced mechanical changes and refraction differentials.

FIGS. 6–10 illustrate various embodiments for the shadow sensors. In FIG. 6 the sensors comprise conductive wires 80,82 formed from tungsten, carbon or silicon carbide or other materials capable of withstanding the system's operating temperatures. The beam 84 causes a shadow 86 from the upstream fiber to be cast between the two sensor wires. The wires 80,82 are connected respectively through resistors R1,R2 to the two inputs of an operational amplifier A1. A ground reference for the non-inverting input is provided through resistor R3, while a negative feedback path is provided between the output and inverting input of the amplifier through resistor R4. The amplifier-resistor network thus described comprises a null seeking servo which produces an output to meter 88 proportional to any secondary emission current imbalance between the two sensor wires 80,82. The amplifier output is also delivered as a controlling signal in the servo loop, illustrated in FIGS. 1 and 2, to adjust the beam propagation.

FIG. 7 illustrates an embodiment in which the two shadow sensors 90,92 are provided in the form of optical fibers which are doped to fluoresce when exposed to beam particles. A suitable type of fiber would be uranium doped glass, although various other fibers could also be used. The ends of the fibers 90,92 are directed towards a pair of matched photodetector diodes D1,D2. Any portion of the particle beam which strikes one or the other of the optical fibers will cause that fiber to fluoresce in an amount proportional to the intensity of the incident beam, and to deliver an optical signal which causes its corresponding photodetector diode to conduct an electric current. Any imbalance in the position of shadow 94 between the two optical fibers will result in a similar imbalance between the currents generated in D1 and D2. The two diodes are connected to the inputs of an operational amplifier A2, the output of which is connected to a meter 96 and also to the particle beam generator servo loop. An advantage of optical fibers is that the fibers can be quite long. This permits the photodetectors to be far removed from the particle beam, which normally is accompanied by a substantial amount of electrical noise in its immediate vicinity.

Figure 8:
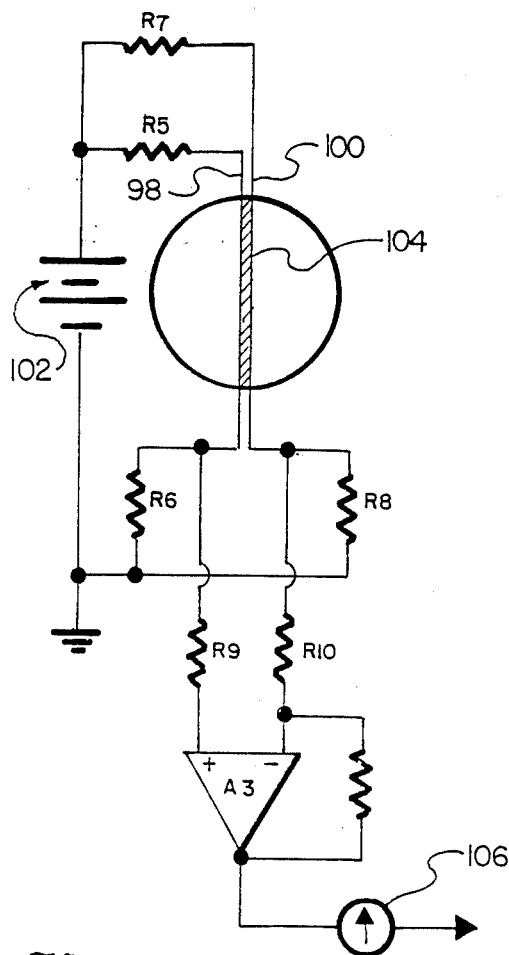

In FIG. 8 an embodiment is shown in which the shadow position is sensed by sensing the resistance change in a pair of conductive wires 98,100 resulting from heating of the wires by the particle beam. The first conductor 98 is connected in series with a battery 102 and resistors R5,R6, while conductor 100 is connected in series with the same battery and resistors R7,R8. Resistors R6 and R8 are connected between their respective sensor wires and the negative battery terminal, which is grounded. The two series circuits R5,98,R6 and R7,100,R8 in essence comprise voltage divider circuits, with the voltages across R6 and R8 dependent upon the resistances of wires 98 and 100. Those resistances in turn depend upon the heating of the wires from incident beam particles. If the shadow 104 is positioned evenly between the two sensors, their resistances will be equal; if the remainder of their respective voltage divider circuits are also balanced, the voltages across R6 and R8 will also be equal. Any positional offset of the shadow with respect to the sensor wires 98,100 will be reflected in the wire having the greater amount of shadow receiving a lesser amount of heating. This in turn will produce an imbalance in the two wire resistances which is reflected in an imbalance in the voltages across R6 and R8, the magnitude of the voltage imbalance corresponding to the degree of shadow offset. These voltage signals are applied to the inputs of an operational amplifier A3 through resistors R9,R10. As with the previous embodiments, a negative feedback path is provided across the amplifier and a current meter 106 at its output.

Figure 9:
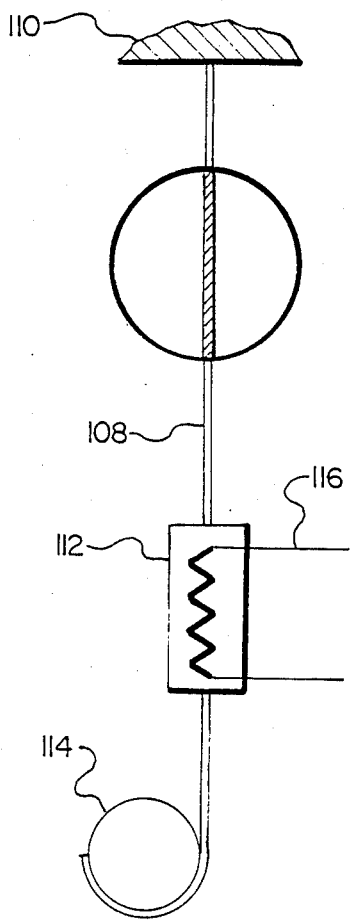

The next embodiment, illustrated in FIG. 9, operates by detecting the heating of a signal fiber placed in the beam by sensing mechanical changes in the fiber. The fiber 108, preferably formed from manganese, is secured at one end to a fixed positional reference 110 and at its other end to a device for measuring heat-induced mechanical changes in the fiber, such as a strain gauge 112 provided with a pre-load adjustment mechanism 114. The strain gauge 112 produces an electrical signal on lead 116 corresponding to the mechanical stress in the sensing fiber. Other materials that could be used for the fiber are glass, sapphire, tungsten or piano wire. Only a single sensing fiber 108 is illustrated because of space limitations, but in theory a pair of parallel fibers could be provided on opposite sides of the shadow as in the previously described embodiments.

If the shadow is centered on the single sensing fiber 108, minimum heating and mechanical change will occur. As the shadow is offset to one side or the other, the amount of heating and mechanical change will correspondingly increase. A disadvantage of the single sensor approach is that, while the absolute value of shadow offset may be ascertained, the direction of the offset will be unknown.

Figure 10:
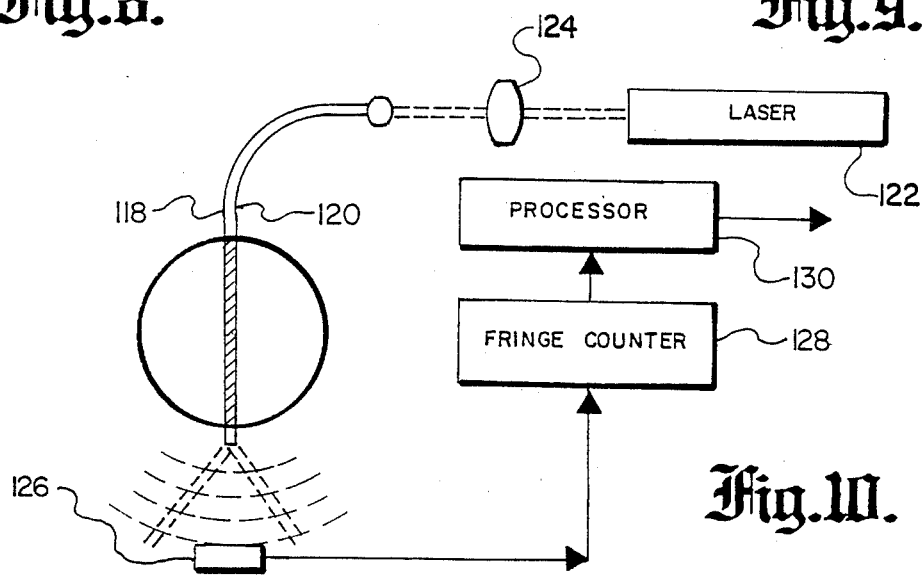

Referring now to FIG. 10, another embodiment is shown in which a pair of parallel optical fibers 118,120 are placed in the beam path and illuminated at one end by a laser source 122 and appropriate coupling device 124. A photodetector 126 is placed at the opposite ends of the optical fibers and spaced therefrom so that it is illuminated by light omitted from both fibers. The optical fibers, which are preferably glass, will be heated in amounts corresponding to the intensity of incident beam particles, and inversely with the amount of shadow falling upon each fiber. The index of refraction of each fiber is progressively changed in proportion to its heating. If there is a differential in the amount of shadow upon the two fibers, and thereby in the heating of the fibers, the resulting differential in index of refraction will cause the light emitted from the two fibers to interfere at the photodetector 126. The photodetector output is delivered to a fringe counter 128 and processor 130 which determine the shadow position based upon the differential interferometric measurement of change in index of refraction, and also to the servo loop for the beam generator.

An advantage of each of the above parallel sensor approaches is that the shadow information is obtained as a differential signal. This lends itself to high degrees of amplification and correspondingly high accuracies.

A shadow sensor arrangement that does not require the removal of charged particles from the shadows is illustrated in FIG. 11. In this embodiment a single fiber 132 is illustrated as casting a shadow 134 in the beam 136. It will be recalled that, due to the fiber stripping electrons from incident beam particles, the shadow 134 will generally be characterized by positively charged particles. The beam external to the shadow, however, will normally have a combination of neutral particles, positively charged particles and negatively charged particles. A telescope 138 external to the beam is focused on the beam plasma in the vicinity of the expected shadow location. Fluorescent radiation from the beam particles is focused onto a detector array 140 in the telescope's image plane. A computer 142 scans the array to determine the location of emissive spectra corresponding to the fiber shadow 134; the shadow location is then related to the fiber location to determine the beam direction.

Any atomic particle with at least one electron will radiate at a number of different wavelengths in a characteristic radiation spectrum. The embodiment of FIG.

11 relies upon the fact that a neutral particle of a given element and positive and negative ions of the same element will all radiate at different characteristic wavelengths. Since the fiber shadow has predominantly positive ions, it will be characterized by a radiation spectrum that is distinctly different from the spectrum produced by the remainder of the beam. The telescope 138 senses one or more of the radiating wavelengths that distinguish the shadow from the remainder of the beam. That is, it can sense either a shadow wavelength which is not present in the beam and thereby sense the shadow directly, or it can sense a beam wavelength which is not present in the shadow and thereby sense the shadow by the absense of such radiation. For example, for a hydrogen beam the beam plasma will typically have a combination of $H^0$, $H^+$ and $H^-$ ions, while the shadow will have $H^+$ ions. Since $H^+$ does not radiate, telescope 138 can be set to detect any one or more of the radiating wavelengths of either $H^0$ or $H^-$, and a blank area on the detector array 140 will indicate the location of the shadow.

Referring now to FIG. 12, an alternate approach is illustrated for aligning the boresight detector 38 of FIGS. 1 and 2 with the neutral particle beam. In this embodiment fiber array 16 is provided as a grid of fibers in an x,y matrix. This makes it possible to obtain beam divergence information at a number of different locations in the beam, and also to implement the coarse servo control illustrated in FIGS. 1 and 2. The fiber grid extends across the inside circumference of the fiber support mirror 18. The inside diameter of the support mirror is larger than the outside diameter of the particle beam 144, illustrated in dashed lines. An annular laser beam is transmitted coaxially with the neutral particle beam 144 in the gap between the neutral particle beam and support mirror. Since the fiber grid extends through the laser beam, optical shadows of the laser beam will be produced in a direction parallel to the neutral particle beam shadows. The laser shadows can be detected at the same downstream location in a manner similar to the detection of the neutral particle beam shadows. This allows for optical alignment of the alignment laser to the fiber plane and neutral particle beam in case the laser beam shadows are found to be not exactly parallel to the neutral particle beam shadows.

Figure 13:
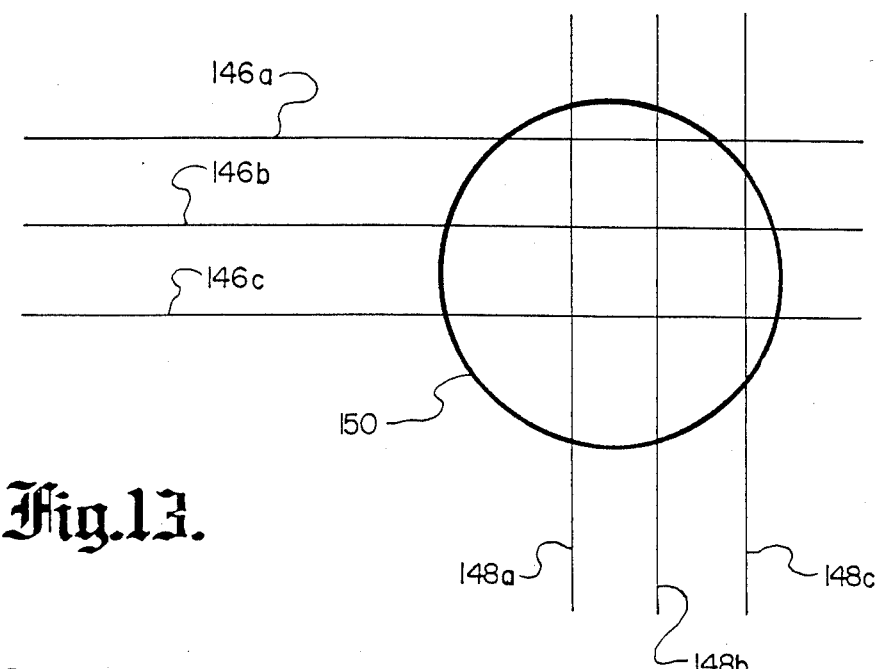
FIG. 13 is a plan view of a wire grid used to obtain a coarse measurement of the particle beam position.

A mechanism for determining the coarse particle beam characteristics is illustrated in FIG. 13. The optical fibers are provided as a grid of three horizontal conductive wires 146a, 146b, 146c and three vertical conductive wires 148a, 148b, 148c; a greater number of wires would ordinarily be used for greater beam definition, but only three wires in each direction are illustrated for simplicity. The neutral particle beam 150 is illustrated as being offset down and to the left of the grid center. In this condition horizontal fiber 146c will have maximum exposure to the beam, while fibers 146b and 146a will have progressively less of their lengths exposed in the beam. Similarly, vertical fiber 148a will have maximum beam exposure, while fibers 148b and 148c will have progressively less of their lengths within the beam. Since the amount of secondary emission current generated in each wire varies with the length of the wire within the beam and the beam intensity profile, and the beam intensity generally diminished towards its edges, the horizontal wire current will be greatest for wire 146c, less for 146b and still less for 146a. Similarly, the vertical wire currents will be greatest for wire 148a, less for 148b and lowest for 148c. In this way the position of the beam can be determined within coarse tolerances by simply completing discharge circuits for the grid wires through current sensor circuit 28 of FIGS. 1 and 2, sensing the exposure of each wire to the beam as a function of the amount of charge accumulated by the wire (and thus the magnitude of the wire discharge current), and comparing the currents for the various wires. It is not necessary to obtain absolute current measurements, since a beam location can be determined simply from the relative differentials in the various wire currents.

Figure 14:
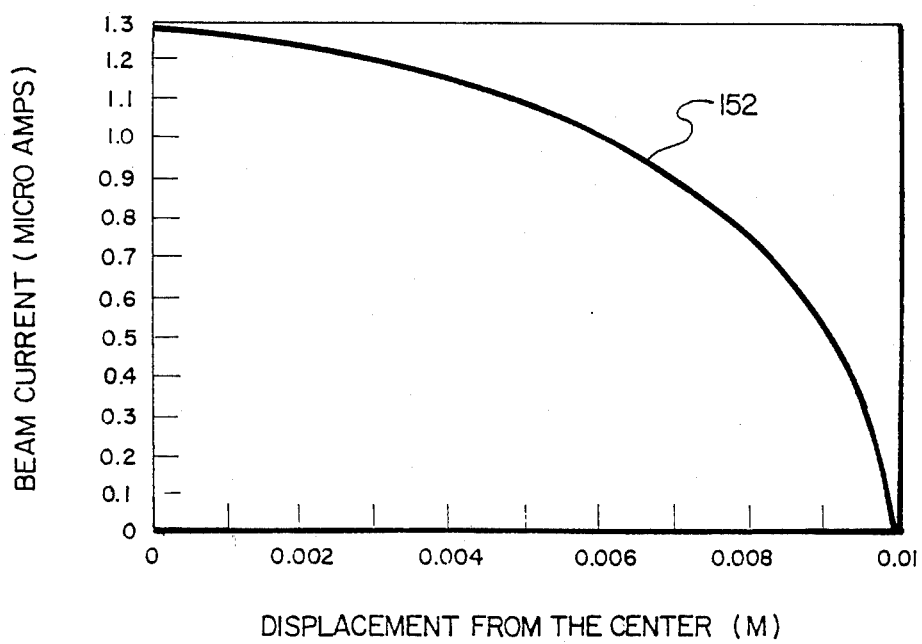
FIG. 14 is a graph of the current induced in the various grid wires of FIG. 13 as a function of the particle beam position.

The magnitude of sensed current for an individual grid wire as a function of the particle beam position is illustrated in FIG. 14. With the beam centered directly on the wire such that the wire extends along a diameter of the beam, a maximum current level is achieved at the vertical axis. As the beam is moved further and further off center from the wire, the sensed current will progressively reduce at an accelerating rate along curve 152, until it reaches zero when the beam is completely off the wire. As the current curve approaches this point it will generally drop at a even faster rate than the reduction in the wire length within the beam, since the beam intensity will also generally diminish towards its extremities. If sufficient wire sensors are employed, this phenomenon can be utilized to obtain a measurement of the beam's intensity profile as well as its location.

Numerous different embodiments of a system and method for obtaining a spatial characterization of a particle beam, including the beam direction, location, divergence and aberrations, as well as for adjusting the beam propagation to a desired state in response to the sensed beam characteristics, have thus been shown and described, As numerous modifications and alternate embodiments will occur to those skilled in the art, it is intended that the invention be limited only in terms of the appended claims.

We claim:

1. A particle beam spatial characterization apparatus, comprising:
   an array of fibers disposed in the beam path, the fiber thicknesses normal to the beam being much smaller than the beam diameter, said fibers each casting a shadow in the beam in a direction determined by the beam direction,
   means supporting the fibers at known positions relative to a position reference, and
   means for sensing fiber shadows at a downstream location from the fiber array to spatially characterize the beam.

2. The particle beam spatial characterization apparatus of claim 1, said fibers being arranged in a grid.

3. The particle beam spatial characterization apparatus of claim 1, further comprising means for adjusting the beam propagation, said detecting means being connected in a feedback loop with the beam adjustment means to adjust the beam to a desired propagation state in response to the spatial incidence pattern of the beam on the fiber array as detected by the detecting means.

4. The particle beam spatial characterization apparatus of claim 3, said beam propagation adjustment means being adapted to adjust the beam direction.

5. The particle beam spatial characterization apparatus of claim 4, wherein the beam is formed from neutral particles, the fibers being adapted to strip electrons from the neutral beam particles to produce charged particle shadows, and further comprising magnetic field means for deflecting and removing charged particles from the fiber shadows to allow detection of a neutral particle shadow.

6. The particle beam spatial characterization apparatus of claim 5, said downstream means for sensing the fiber shadows comprising means for sensing the downstream shadow positions, and further comprising means for comparing the downstream shadow positions with the fiber positions to determine the beam direction.

7. The particle beam spatial characterization apparatus of claim 5, said downstream means for sensing the fiber shadows comprising means for sensing the downstream shadow widths and thereby sensing the beam divergence by comparison with the fiber widths.

8. The particle beam spatial characterization apparatus of claim 5, the downstream locating means including, for each of selected fibers in the array, a pair of elongate sensors substantially parallel to said fiber and spaced apart to accommodate at least a portion of the fiber shadow therebetween, and means for sensing imbalances in the portion of the shadow incident on the respective sensors for each selected fiber.

9. The particle beam spatial characterization apparatus of claim 8, said fiber array including a pair of fibers disposed in a crosshair arrangement, with corresponding downstream sensor pairs disposed in a similar crosshair arrangement.

10. The particle beam spatial characterization apparatus of claim 5, the beam comprising charge-neutralized particles, wherein said fibers each comprise a conductive wire adapted to obtain a charge from the incident beam, the magnitude of charge on each wire varying in accordance with the length and position of the wire within the beam, and said means for detecting the spatial incidence pattern of the beam on the wire array further comprises means for sensing the relative amounts of charge obtained by the respective wires.

11. The particle beam spatial characterization apparatus of claim 10, said means for detecting the amount of charge obtained by each wire comprising means for completing circuits to discharge the wire charges, and means for sensing the discharge current of each wire.

12. The particle beam spatial characterization apparatus of claim 10, further comprising means for adjusting the beam propagation, said means for sensing the amount of charge obtained by each wire being connected in a first feedback loop with the beam adjustment means to apply a coarse adjustment to the beam in response to the pattern of sensed currents, and said downstream means for sensing the wire shadows being connected in a second feedback loop with the beam adjustment means to apply a fine adjustment to the beam in respone to the positions of the sensed shadows.

13. The particle beam spatial characterization apparatus of claim 12, said beam propagation adjustment means being adapted to adjust the beam direction.

14. The particle beam spatial characterization apparatus of claim 1, the beam comprising charge-neutralized particles, wherein said fibers each comprise a stationary conductive wire adapted to obtain a charge from the incident beam, the magnitude of charge on each wire varying in accordance with the length and position of the wire within the beam, and said means for detecting the spatial incidence pattern of the beam on the wire array comprises means for sensing the relative amounts of charge obtained by the respective wires.

15. The particle beam spatial characterization apparatus of claim 14, said means for detecting the amount of charge obtained by each of the wires comprising means for completing circuits to discharge the wire charges, and means for sensing the discharge current of each wire.

16. In a neutral beam generator which includes means for generating a charged particle beam approximately in a predetermined direction, means for neutralizing the charged beam particles, a reference surface for aligning the charged particle beam, means for adjusting the direction of the beam, and a beam discharge housing, the improvement comprising a high precision aiming system for the beam which comprises:

an array of fibers disposed in the beam path in the beam discharge housing, the fiber thicknesses normal to the beam being much smaller that the beam diameter, the fibers being adapted to strip electrons from the neutral beam particles striking the fibers and thereby cast shadows in the beam in a direction determined by the beam direction, means supporting the fibers within the beam discharge housing at predetermined orientations relative to the reference surface, means for aligning the fibers with the reference surface, shadow sensor means for locating the fiber shadows at a downstream location from the fiber array, and a direction adjustment control responsive to the sensed downstream shadow locations for controlling the beam direction adjustment means to adjust the beam direction to achieve a predetermined shadow location corresponding to a desired beam direction.

17. The beam aiming system of claim 16, further comprising means for establishing a magnetic field between the fiber array and the downstream locating means to deflect and remove charged particles from the fiber shadows to allow detection of a neutral particle shadow.

18. The beam aiming system of claim 16, said downstream shadow sensor means comprising an array of conductive wires in the beam path, the beam generating secondary emission currents in the wires in its path, the fiber shadows generating lesser secondary emission currents in the wires in their paths, the magnitude and distribution of the wire currents varying with the incidence pattern of the shadows upon the wires, and means for sensing the wire currents as an indication of the downstream shadow locations.

19. The beam aiming system of claim 17, said downstream shadow sensor means comprising an array of fluorescent optical fibers adapted to generate optical signals whose magnitude and distribution among the optical fibers vary with the incidence pattern of the shadows upon the optical fibers, and means for sensing the optical signals as an indication of the downstream shadow locations.

20. The beam aiming system of claim 17, said downstream shadow sensor means comprising an array of fibers adapted to generate heat in amounts that vary with the incidence pattern of the shadows upon the downstream fibers, and means for sensing the heat pattern generated by the fibers as an indication of the downstream shadow locations.

21. The beam aiming system of claim 20, said downstream fiber array comprising fibers adapted to sustain thermally induced mechanical changes in amounts which vary with the incidence pattern of the shadows upon the downstream fibers, and said sensing means comprises means for sensing the amounts of said mechanical changes.

22. The beam aiming system of claim 20, said downstream fiber array comprising an array of conductive wires the resistance of which varies with the heat generated by the respective wires, and said sensing means comprising means for sensing resistance changes in said wires.

23. The beam aiming system of claim 20, said downstream fiber array comprising at least one pair of optical fibers whose indices of refraction vary with the heat generated by the respective fibers, said sensing means comprising differential interferometric means for sensing changes in the fibers' indices of refraction, and further comprising a light source for transmitting optical signals through the downstream fibers.

24. The beam aiming system of claim 16, said shadow locating means comprising means for sensing the degree of electron stripping present in the beam at a predetermined downstream location in an expected shadow path.

25. The beam aiming system of claim 16, further comprising laser means for transmitting a laser beam onto the fibers in alignment with the particle beam path, and said shadow locating means comprising optical sensing means for locating the optical shadows cast in the laser beam by the fibers.

26. The beam aiming system of claim 16, said means for aligning the fibers with the reference surface comprising a support structure for the fibers which lies in a plane substantially parallel to the fiber plane, and means for aligning the support structure with the reference surface.

27. The beam aiming system of claim 26, said reference surface being reflective, said support structure comprising a reflective member disposed in the discharge housing, and its associated alignment means comprising a laser, means for directing respective portions of the laser beam onto the reference surface and the reflective member at predetermined angles, and means for comparing the laser reflections from the two.

28. The beam aiming system of claim 27, said reflective member comprising a generally annular member surrounding and spaced outward from the particle beam path.

29. A method for spatially characterizing a particle beam, comprising:
placing an array of fibers in the beam path at known positions,
casting shadows of the fibers with the beam in a direction determined by the beam direction, and
detecting the spatial incidence pattern of the beam on the fiber array by sensing the fiber shadows at a downstream location from the fiber array.

30. The method of claim 29, further comprising the step of adjusting the beam propagation to a desired propagation state in response to the detected spatial incidence pattern of the beam on the fiber array.

31. The method of claim 30, wherein the fiber shadows are sensed by placing a pair of elongate sensors at the downstream location substantially parallel to the respective fibers and spaced apart to accommodate at least a portion of the shadows from respective fibers therebetween, and sensing imbalances in the portion of each shadow incident on the sensors of its respective sensor pair.

32. The method of claim 31, wherein the beam is formed from neutral particles, the fibers being adapted to strip electrons from the neutral beam particles striking the fibers to produce charged particle shadows, and further comprising the step of magnetically deflecting and removing charged particles from the fiber shadows to allow detection of a neutral particle shadow.

33. The method of claim 32, wherein the fiber shadows are sensed at the downstream location by placing an array of conductive wires in the beam path at the downstream location, and sensing the relative magnitudes and distribution of secondary emission currents generated in the wires.

34. The method of claim 32, wherein the fiber shadows are sensed at the downstream location by placing an array of fluorescent optical fibers in the beam path at the downstream location, and sensing the relative magnitudes and distribution of optical signals generated in the optical fibers.

35. The method of claim 34, wherein the fiber shadows are sensed at the downstream location by placing an array of fibers in the beam path at the downstream location, the downstream fibers being adapted to generate heat in response to incident beam particles, and sensing the heat pattern generated by said downstream fibers.

36. The method of claim 33, wherein the beam is formed from neutral particles, the fibers are adapted to strip incident neutral beam particles to produce charged particle shadows, and the fiber shadow are sensed at the downstream location by sensing the degree of stripping present in the beam at a predetermined downstream location in an expected shadow path.

37. The method of claim 33, further comprising the step of transmitting a laser beam onto the fibers in alignment with the particle beam path, wherein the fiber shadows are sensed at the downstream location by optically sensing the optical shadows cast by the fibers in the laser beam.

38. The method of claim 33, wherein the array of fibers is placed in the beam path at a known position relative to a position reference, the beam position is detected at the downstream location by sensing the positions of the fiber shadows at that location, and the beam direction is detected by comparing the downstream shadow positions with the fiber positions.

39. The method of claim, wherein the divergence of the beam is sensed by sensing the shadow widths at the downstream location and comparing them with the fiber widths.

40. The method of claim 39, wherein the divergence of the beam is sensed at a plurality of locations in the beam to detect beam aberrations.

41. The method of claim 30, wherein the fibers are provided as conductive wires positioned to obtain charges from the beam in magnitudes which vary with the lengths and positions of the respective wires within the beams, and the spatial incidence pattern of the beam on the wires is detected by sensing the amount of charge obtained by each wire.

42. The method of claim 41, wherein the array of fibers is placed in the beam path at a known position relative to a position reference, and the beam position at the wire array is determined from the sensed charge for each wire.

43. The method of claim 42, wherein the beam direction is detected by comparing the beam position at the wire array with the position reference.

44. The method of claim 42, wherein a beam intensity profile is determined from the sensed charge for each wire.

45. The method of claim 30, wherein the beam propagation adjustment comprises steering the beam direction to a desired direction.

* * * * *